Aug. 13, 1968  E. P. CARTER  3,396,917
METHOD FOR UNWINDING ROLLS
Filed March 1, 1966

*INVENTOR*
ELBERT P. CARTER

BY *Claude L. Beaudoin*
*ATTORNEY*

United States Patent Office 3,396,917
Patented Aug. 13, 1968

3,396,917
METHOD FOR UNWINDING ROLLS
Elbert P. Carter, Wilmington, Del., assignor to E. I. du Pont de Nemours and Company, Wilmington, Del., a corporation of Delaware
Filed Mar. 1, 1966, Ser. No. 530,937
5 Claims. (Cl. 242—55)

ABSTRACT OF THE DISCLOSURE

A method for reducing electrostatic charges on a pellicle being unwound from a roll by passing the surface of the pellicle, prior to the joint of separation from the roll, in close proximity to a charge removal device that extends parallel to the roll.

---

The present invention relates to a method for reducing the electrostatic charges on pellicles of synthetic organic polymeric material and, more particularly, is directed to improvement in and relating to a method for removing or reducing the level of electrostatic charges on pellicles of synthetic organic polymeric material during unwinding said pellicles from a roll thereof.

A serious problem attaching to the production and handling of pellicles of synthetic organic polymeric material is that regarding electrostatic charges that accumulate on the surfaces of the pellicle. It is well known, for instance, that many pellicle manufacturing and handling operations cause electrostatic charges to accumulate on the surfaces thereof. It has now been discovered unexpectedly that electrostatic charges accumulate on the surfaces of pellicles when unwinding rolls thereof that are even free initially of such charges, i.e., "dead rolls." The foregoing is further aggravated by the build-up of induced electrostatic charges on the surface of the inner convolutions of such rolls as they are unwound. The electrostatic charges that accumulate on the pellicle surfaces are undesirable because, inter alia, they attract dust and other particles leading to contamination of the pellicle surfaces, are the source of sparks and painful shocks to personnel handling the pellicles and produce electrostatic patterns on the pellicle surface which adversely affect the coating thereof wtih coating compositions. Attempts have been made to remove or reduce the level of electrostatic charges on a pellicle during the production and handling thereof, such as contacting the pellicle with strands of conductive material at random points along its path of travel in the course of its manufacture and handling. Although such attempts have perhaps effected some improvement, they are largely inadequate and fail to provide a satisfactory solution to the problem of electrostatic charges on pellicle surfaces because they cope essentially with only limited sources thereof. The type of random discharge procedure mentioned above cannot effectively remove all of the accumulated electrostatic charges, and passage of the pellicle over or near grounded bodies will cause uncontrolled discharging resulting in randomly charged areas on the surface of the pellicle.

The present invention is directed to alleviating that source or cause of electrostatic charges on pellicle surfaces that is due to unwinding of the pellicle from a roll thereof. That is, unwinding a pellicle from a roll thereof produces electrostatic charges of uniform polarity and of a relatively narrow but high voltage range on each surface of the pellicle at about the point in the unwinding operation where the pellicle separates from the preceding layer on the roll. For instance, pellicles of, for example, polyethylene, polypropylene, polyethylene terephthalate, although neutral or substantially neutral before unwinding, acquire electrostatic charges of from 20 to 40 kilovolts (kv.) upon being unwound from roll form. It is, therefore, the principal object of the present invention to provide a method for removing or reducing the level of electrostatic charges on pellicles of synthetic organic polymeric material especially during the unwinding thereof from rolls thereof.

According to the present invention there is provided a method for unwinding a pellicle from a roll to obtain a pellicle substantially free of electrostatic charges on the surface thereof which comprises unwinding said pellicle from said roll and electrically neutralizing said pellicle by passing the surface of said pellicle prior to the point of separation thereof from said roll in close proximity to an electrostatic charge removal device.

The nature and advantages of the invention will be more clearly understood by the following description, the appended claims, and the several views illustrated in the accompanying drawings wherein like reference characters refer to the same parts throughout the several views and in which:

Figure 1:
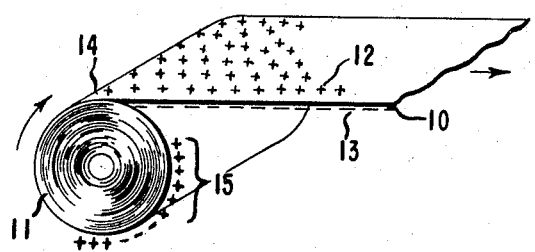
FIGURE 1 shows in a general manner the nature of electrostatic charges on the surface of a pellicle during unwinding of the pellicle from a roll.

Electrostatically charged areas which may be randomly located on the surface of the pellicle are illustrated in FIGURE 1. It is observed during the unwinding of a roll of web material having a dielectric surface which contacts a dielectric surface of the next adjacent convolution on the roll, that the electrostatic charges on the surface of the roll, which initially may range from nearly zero to a kilovolt or more, do not increase very rapidly during the first several turns of the roll. However, as the unwinding proceeds the potential of the electrostatic charges increases quite rapidly until the roll is completely unwound at which point the potential of each charge may reach ten of kilovolts and cause the accumulation of dust and debris on the web or pellicle, poor runnability on slitting or other processing machinery as well as dangerous sparking. Furthermore, in textile fabrics, especially those woven of synthetic materials of high static propensity, the hand thereof is very poor. Measurement of the electrostatic charge on the periphery of the roll (as with a Kiethly model 250 electrometer equipped with a model 2501 detector head) provides no clue to the cause of this high surface charge, and it appears that such charges inherently result from the unwinding operation. FIGURE 1 shows a pellicle or web 10 being unwound from roll 11 and having positively charged areas 12 and negatively charged areas 13 randomly distributed on each surface thereof, respectively. Starting with a neutral or "dead" roll, as the first or outermost layer thereof is unwound, an electrostatic charge appears at line of separation 14. An electrostatic charge of opposite polarity appears on the opposite or inner surface as shown, and as has been indicated hereinabove, such electrostatic charges continue to accumulate as the roll is unwound. It is postulated, but not considered binding, that electrostatic charges of opposite polarity are induced on the surfaces of the inner convolutions of the roll as the electrostatic charges continue around the outer surface moving on around the roll, partially shown in FIGURE 1 for clarity as electrostatic charges 15. Furthermore, if the outer electrostatic surface charges are not removed and are added to by triboelectric charging incident to separation of two convolutions of the roll, the net result is a gradual increase of electrostatic charging as the roll is unwound. Therefore, it is essential to remove the electrostatic charges before the electrical potential level thereof becomes too great. It is to be understood that the polarities shown in the figures are arbitrarily selected for illustrative purposes only.

Figure 2:
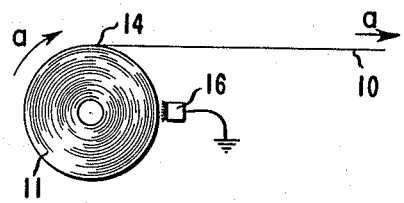
FIGURE 2 shows the manner of practicing the present invention.

FIGURE 2 illustrates an embodiment of the essential features of the method and mechanical means effective for removing the electrostatic charge resulting from unwinding pellicle 10, to provide a roll of uniformly low electrostatic charge or substantially no electrostatic charge in accordance with the present invention. Pellicle 10 is unwound from roll 11 in the direction of arrows *a* by suitable mechanical means including a motor driven mandrel, not shown. Electrostatic charge removal device 16 located near the surface of roll 11 is the effective means for removing the electrostatic charges initially formed upon separation of the pellicle or web from roll 11 and before the electrostatic charges on the surface of the pellicle can cause the secondary effect of inducing charges of opposite polarity on the opposite or inner surface of the pellicle. The electrostatic charge removal device 16 is preferably an induction bar which in its preferred form has a plurality of clusters of fine conductive bristles mounted in a non-conductive bar support, with the bristles suitably electrically grounded through their bases, and is mounted transversely of roll 11 in a position to remove the electrostatic charges on the surface thereof as promptly as possible after separation of the previous convolution from the roll. The longer a charged layer or convolution of web is in close relation to an uncharged layer, the greater will be the inductive effect mentioned hereinabove and, therefore, it is preferred to remove any and all electrostatic charges as soon as possible after they are formed. The induction bar 16 may conveniently be the commercially available "Magic Wand," manufactured by Herman H. Sticht Company, New York, N.Y.

The location of the electrostatic charge removal device 16 is determined to some extent by considerations of mechanical convenience. While it is highly desirable to position the electrostatic charge removal device along the tangent line such as 14 where the web or pellicle unrolls from the roll, the mechanical difficulty of maintaining the induction bar at a functional distance from the web surface often makes such positioning impracticable. The induction bar should be positioned not more than approximately two inches from the web or roll surface; preferably, the induction bar is positioned and maintained about one-fourth inch from the web surface. It is found that satisfactory results are obtained, in consideration of the efficiency of electrostatic charge removal and the complexity of the apparatus for maintaining the charge removal device at an operative distance, by positioning the electrostatic charge removal device at approximately 90° from the line of separation of the web from the roll, as is shown in FIGURE 2. The induction bar, parallel to the axis of roll 11, is maintained to keep the conductive portions (the metal bristles) thereof between about one-fourth inch and about two inches from the surface of the outer web of the roll. The distance is maintained within this range by any suitable means, preferably by maintaining the induction bar on a linearly movable rack cooperatively engaging a pinion gear driven by a servo motor which is controlled by an optical device and accessory apparatus as is known to the art for sensing the periphery of the roll. Alternatively, the distance may be controlled by rollers which ride on the surface of roll 11, but this method is less desirable due to the possibly adverse effects of the rollers on the surface of roll 11.

In the present invention, the inductive type of electrostatic charge removal device operates solely on the basis of the electrostatic charges present. On the other hand, other electrostatic charge removal devices may be employed in conjunction with the induction bar in order to obtain a web or pellicle having as low an electrostatic charge as possible.

Figure 3:
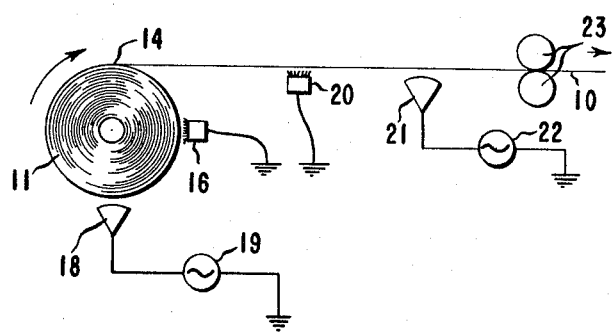
FIGURE 3 shows another embodiment of the invention.

The use of other electrostatic charge removal devices in conjunction with an induction bar is shown in FIGURE 3. The essential feature of the embodiment in FIGURE 3 is that the induction type device precedes the use of the other type device so that the electrostatic charges can be reduced to a very low level prior to application of the other device. As shown in FIGURE 3, induction bar device 16 is located in the manner as previously described hereinabove. A driven ion generator 18, supplied with high voltage AC power by generator 19, is located about half-way around the periphery of roll 11. A suitable type of driven ion generator is the "Simco" type supplied by the Simco Company, Lansdale, Pa. A second induction device 20 is also shown, followed also by a second ion generator device 21 driven by generator 22 which serve to remove electrostatic charges from the "inner" surface of web 10. The distance of the additional elements, i.e., ion generator 18 and ion generator 21, from the web surface may be the same as that of induction bar 20. It is preferable to mount ion generator 18 with a servo drive which can keep it within an optimum range of the roll; the servo drive may be controlled by the same apparatus which controls the location of bar 16. It is desirable to separate induction bar 16 and ion generator 18 by a distance of about 90° around the roll, or for somewhat more than the distance of the conductive members of bar 16 from the roll. A similar consideration applies to induction bar 20 and ion generator 21, which may have a fixed mount near rollers 23, so that they are maintained within effective operating distance.

The present invention is especially adapted to the handling of dielectric films which has a high static propensity, such as polyethylene, polypropylene, polyesters, such as polyethylene terephthalate, etc., but it also is useful for paper having coatings of such materials, and also for fabrics, such as those of polyethylene terephthalate, etc., which have a high electrostatic propensity.

The above described method and association of mechanical means has been found to be highly effective for removing the electrostatic charges on the surfaces of a pellicle during unwinding of the pellicle from a roll thereof. The relation of the electrostatic charge removal device and the pellicle, especially the close proximity of the former to the latter, as well as the additional driven type electrostatic charge removal devices, provides a cooperative association of features assuring the removal of the electrostatic charges on the surface of the pellicle during the unwinding thereof from a roll.

Several advantages of the present invention resides in the ease of practice thereof and the low cost and simplicity of installation and low maintenance cost of the associated apparatus. No costly control apparatus is required and no hazards from radiation or sparking exist.

What is claimed is:

1. A method for unwinding a pellicle from a roll structure thereof to obtain a pellicle substantially free of electrostatic charges on the surface thereof which comprises unwinding said pellicle from said roll and electrically neutralizing said pellicle by passing the surface of said pellicle prior to the point of separation thereof from said roll in close proximity to an electrostatic charge removal device disposed transversely to and parallel with said roll structure.

2. The method of claim 1 wherein said electrostatic charge removal device is an induction bar.

3. The method of claim 2 wherein the induction bar comprises a plurality of clusters of conductive bristles maintained within one-quarter inch and two inches of the surface of said pellicle.

4. In the method of unwinding a pellicle of synthetic organic polymeric material from a roll structure thereof wherein said pellicle is rotatably unwound, the improvement comprising passing the surface of said pellicle prior to the point of separation thereof from said roll in close proximity to an induction bar disposed transversely to and parallel with said roll structure thereby to obtain said pellicle substantially free of electrostatic charges on the surface thereof.

5. The method of claim 4 wherein the induction bar comprises a plurality of conductive bristles maintained within one-quarter inch and two inches of the surface of said pellicle.

References Cited

UNITED STATES PATENTS

| | | | |
|---|---|---|---|
| 2,221,776 | 11/1940 | Carlson | 317—2 X |
| 2,449,972 | 9/1948 | Beach | 317—2 |
| 2,744,212 | 5/1956 | Baum | 317—2 |
| 2,778,635 | 1/1957 | Eash | 242—55.19 |
| 2,778,636 | 1/1957 | Eash | 242—55.19 |
| 3,086,145 | 4/1963 | Hood | 317—2 |

WILLIAM S. BURDEN, *Primary Examiner.*